US011648566B2

(12) United States Patent
Romer et al.

(10) Patent No.: US 11,648,566 B2
(45) Date of Patent: May 16, 2023

(54) PIPETTING DEVICE WITH A STATOR MAGNET ASSEMBLY, WHICH CAN BE USED ON BOTH SIDES, AS PART OF A LINEAR-MOTOR DRIVE OF A PIPETTING UNIT

(71) Applicant: Hamilton Bonaduz AG, Bonaduz (CH)

(72) Inventors: Hanspeter Romer, Hinwil (CH); Silvio Walpen, Stäfa (CH); Fridolin Gysel, Adliswil (CH)

(73) Assignee: HAMILTON BONADUZ AG, Bonaduz (CH)

( * ) Notice: Subject to any disclaimer, the term of this patent is extended or adjusted under 35 U.S.C. 154(b) by 341 days.

(21) Appl. No.: 16/765,596

(22) PCT Filed: Nov. 19, 2018

(86) PCT No.: PCT/EP2018/081711
§ 371 (c)(1),
(2) Date: May 20, 2020

(87) PCT Pub. No.: WO2019/101675
PCT Pub. Date: May 31, 2019

(65) Prior Publication Data
US 2020/0298242 A1 Sep. 24, 2020
US 2021/0078010 A2 Mar. 18, 2021

(30) Foreign Application Priority Data
Nov. 22, 2017 (DE) ..................... 10 2017 220 892.9

(51) Int. Cl.
*B01L 9/00* (2006.01)
*G01N 35/10* (2006.01)
*B01L 3/02* (2006.01)

(52) U.S. Cl.
CPC ................. *B01L 9/54* (2013.01); *B01L 3/021* (2013.01); *G01N 35/1011* (2013.01);
(Continued)

(58) Field of Classification Search
None
See application file for complete search history.

(56) References Cited

U.S. PATENT DOCUMENTS 5,530,303 A * 6/1996 Takei ................... H02K 41/031
310/12.27
2003/0113232 A1 6/2003 Reinhardt et al.
2013/0233096 A1 9/2013 Schlegel et al.
(Continued)

FOREIGN PATENT DOCUMENTS

DE 10 2010 064 049 6/2012
DE 10 2012 216 544 3/2014
(Continued)

OTHER PUBLICATIONS

Search Report issued in German Application DE 2017 220 892.9 dated Aug. 20, 2018.
(Continued)

*Primary Examiner* — P. Kathryn Wright
(74) *Attorney, Agent, or Firm* — Tollefson IP (57) ABSTRACT

A pipetting device includes pipetting unit(s), a guide assembly with at least one guide rail on which the pipetting unit(s) is guided in order to be moved along a movement axis, and a linear drive assembly, by which the pipetting unit(s) can be driven in order to be moved along the movement axis. The linear drive device has a stationary stator, and the at least one pipetting unit forms a linear drive assembly rotor which can be moved along the movement axis relative to the stator. The pipetting device also has at least two rotor magnet assemblies which interact with the same common stator magnet assembly so as to generate a drive force and which are
(Continued)

arranged at a distance from one another along a spacing axis that is orthogonal to the movement axis. The common stator magnet assembly is located between the at least two rotor magnet assemblies.

17 Claims, 3 Drawing Sheets

(52) U.S. Cl.
CPC ..... *G01N 35/1067* (2013.01); *G01N 35/1072* (2013.01); *G01N 2035/1069* (2013.01)

(56) References Cited

U.S. PATENT DOCUMENTS

| | | |
|---|---|---|
| 2016/0380562 A1 | 12/2016 | Weber et al. |
| 2019/0257850 A1 | 8/2019 | Romer |

FOREIGN PATENT DOCUMENTS

| | | |
|---|---|---|
| DE | 10 2016 212 444 | 1/2018 |
| EP | 1 321 222 | 6/2003 |
| EP | 2 656 083 | 10/2013 |
| JP | 2004-312956 A | 11/2004 |
| JP | 2006-197770 A | 7/2006 |
| JP | 2009-168728 | 7/2009 |

OTHER PUBLICATIONS

International Search Report issued in International Application No. PCT/EP2018/081711.

English translation of the Written Opinion of the International Searching Authority issued in International Application No. PCT/EP2018/081711.

JP Office Action for JP 2020-52814 dated Oct. 31, 2022.

* cited by examiner

PIPETTING DEVICE WITH A STATOR MAGNET ASSEMBLY, WHICH CAN BE USED ON BOTH SIDES, AS PART OF A LINEAR-MOTOR DRIVE OF A PIPETTING UNIT

CROSS-REFERENCE TO RELATED APPLICATIONS

This application is the National Stage of International Application No. PCT/EP2018/081711, filed on Nov. 19, 2018, which claims the benefit of German Application No. DE 10 2017 220 892.9, filed on Nov. 22, 2017. The contents of both applications are hereby incorporated by reference in their entirety.

BACKGROUND OF THE INVENTION

The present invention relates to a pipetting apparatus having:
- at least one pipetting unit that comprises a pipetting conduit;
- a guidance arrangement having at least one guidance rail on which the at least one pipetting unit is guided to move along a motion axis; and having
- a linear drive arrangement with which the at least one pipetting unit is drivable to move along the motion axis,
- the linear drive apparatus comprising a stator that is stationary relative to the guidance arrangement, and the pipetting unit constituting a rotor, movable relative to the stator along the motion axis, of the linear drive arrangement; the stator comprising a stator magnet arrangement connected fixedly to the guidance arrangement; the stator magnet arrangement encompassing a plurality of magnets that are arranged to follow one another with an alternating magnetic-pole orientation along the motion axis; and the rotor comprising at least one energizable electromagnetic rotor magnet arrangement that is located oppositely from the stator magnet arrangement along a gap axis orthogonal to the motion direction.

Pipetting apparatuses serve as laboratory devices for aspirating and dispensing (pipetting) liquids and, if desired, also for transporting an aspirated liquid from one location to another between aspiration and dispensing. One pipetting operation is possible for each pipetting conduit that is present.

A pipetting apparatus of the kind recited above is known, for example, from EP 2 656 083 A. This document discloses a pipetting apparatus having a plurality of pipetting units that are guided by the guidance arrangement movably along the motion axis. The known pipetting apparatus comprises two guidance arrangements that each define mutually parallel motion axes. Each guidance arrangement comprises two guidance rails carried on one common chassis, and two stator magnet arrangements carried on the same chassis.

Each pipetting unit of the known pipetting apparatus is guided on exactly one guidance rail; two pipetting units that are arranged on the same chassis and that directly follow one another along the motion axis are guided alternatingly on different guidance rails, so that those pipetting units can come as close as possible to one another along the motion axis. This is because as a rule, both the guidance carriages or guidance slides that are movable together with the pipetting units, and the rotor magnet arrangements, have larger dimensions in the direction of the motion axis than those components of the pipetting unit which constitute the pipetting conduit. Separate energization of the rotor magnet arrangements of different pipetting units makes it possible to drive the pipetting units to move independently of one another.

As a result of guidance on different guidance rails, the guidance carriages or guidance slides associated with the pipetting units that directly follow one another can overlap axially, i.e. along the motion axis. For the same reason, the rotor magnet arrangements of pipetting units that directly follow one another along the motion axis interact alternatingly with different stator magnet arrangements. The rotor magnet arrangements that directly follow one another axially can thus also overlap axially, and thus allow the pipetting units to come closer to one another along the motion axis.

This principle is also implemented in the pipetting apparatus known from EP 2 656 083 A, by way of the two chassis disclosed therein. A large number of pipetting conduits that lie in one common plane and are parallel to one another can thus be brought very close to one another along the motion axis. The common plane of the pipetting conduits is located equidistantly between the two chassis.

A collision between pipetting units, or components thereof, that are close to one another along the motion axis can thus be prevented by the fact that pipetting units that axially follow one another are guided not only on different guidance rails but on different guidance rails of different chassis. The result is that in the sequence of pipetting units arranged along the motion axis, if they are considered to be continuously numbered in ascending order starting at "1" for the outermost pipetting unit, a sub-group having all odd-numbered pipetting units is guided on one chassis, and a sub-group having all even-numbered pipetting units is guided on the respective other chassis. Within a sub-group, pipetting units that follow one another along the motion axis are guided alternatingly each on a different one of the two guidance rails of the chassis.

The statements made above regarding guidance of the pipetting units on different guidance rails apply correspondingly to the driving of the pipetting units in interaction with different stator magnet arrangements. The allocation of rotor magnet arrangements to stator magnet arrangements, which are present in the same numerical ratio as that of movable guidance carriages to guidance rails, corresponds to that of guidance carriages or guidance slides to guidance rails: each chassis of the known pipetting apparatus carries two stator magnet arrangements, and each pipetting unit carries one rotor magnet arrangement. The rotor magnet arrangements of pipetting units that directly follow one another along the motion axis interact with stator magnet arrangements on different chassis. The rotor magnet arrangements of pipetting units that are guided and driven on one and the same chassis are arranged alternatingly along the motion axis, each oppositely from a different stator magnet arrangement and interactingly therewith.

Although very close proximity of pipetting units along the motion axis can be achieved with this arrangement, considerable installation space is required for that close proximity.

SUMMARY OF THE INVENTION

The object of the present invention is therefore to refine the pipetting apparatus recited initially in such a way that substantially the same proximity of pipetting units that follow one another along the motion axis is possible along that motion axis, simultaneously with a decreased installation space requirement for the pipetting apparatus as a whole.

This object is achieved according to the present invention by a pipetting apparatus of the kind recited initially which comprises at least two rotor magnet arrangements that interact in drive-force-generating fashion with the same common stator magnet arrangement and that are arranged with a spacing from one another along a spacing axis orthogonal to the motion axis, the common stator magnet arrangement being located between the at least two rotor magnet arrangements.

Thanks to the above-described arrangement of rotor magnet arrangements, which can be (but, as will be shown below, do not need to be) arranged with a spacing from one another along the motion axis but are arranged with a spacing from one another along the spacing axis that is orthogonal to the motion axis, the stator magnet arrangement can be arranged in space-saving fashion between the rotor magnet arrangements that are thus arranged with a spacing from one another along the spacing axis. As a consequence, the magnetic field proceeding from one and the same stator magnet arrangement can be utilized by rotor magnet arrangements, arranged with a spacing from one another along the spacing axis, on different, preferably opposite, sides of the stator magnet arrangement, to generate drive force.

In the pipetting apparatuses of the existing art, the magnetic field proceeding from a stator magnet arrangement was utilized only on one side of the stator magnet arrangement. That side of a stator magnet arrangement which is located opposite one or several rotor magnet arrangements along the gap axis will be referred to hereinafter as a "magnetic-pole active side." The stator magnet arrangement of the pipetting apparatus presented here comprises, in contrast to that of the known pipetting apparatus, two magnetic-pole active sides.

For advantageous low-interference motion of a rotor magnet arrangement along the magnetic-pole active side of the stator magnet arrangement associated with the rotor magnet arrangement, along with a very small possible gap dimension for the air gap constituted between the rotor- and stator magnet arrangements, the magnetic-pole active side is preferably embodied on an outer surface of the stator magnet arrangement which is parallel to the motion axis and is therefore particularly preferably flat. According to a preferred refinement of the present invention, both magnetic-pole active sides of one and the same stator magnet arrangement are embodied on mutually parallel outer surfaces of the stator magnet arrangement.

The stator magnet arrangement can encompass electromagnets. Preferably, however, the magnets of the stator magnet arrangement are permanent magnets.

Whereas in stator magnet arrangements of known pipetting apparatuses, the outer surface of the stator magnet arrangement which is located oppositely from the individual magnetic-pole active side is connected, for example by adhesive bonding, to a carrying component in order to mount the stator magnet arrangement, with the stator magnet arrangement of the present pipetting apparatus, both outer surfaces that constitute magnetic-pole active sides are preferably exposed at least in portions.

When the carrying component is embodied from ferromagnetic material it can be used as a magnetic yoke component; this is no longer the case with the bilaterally acting stator magnet arrangement now being described. It has been found, however, that in order to furnish sufficient drive force for a comparatively low-mass pipetting unit, the magnetic field furnished by a stator magnet arrangement is sufficient even without a yoke component.

There exist in principle two different possibilities for utilizing the advantage obtained by way of the stator magnet arrangement that is bilaterally active (i.e. has two magnetic-pole active sides) and is utilized bilaterally: on the one hand, for a pipetting-unit dimension that is otherwise the same, the drive force that acts along the motion axis on an individual pipetting unit can be increased if the pipetting unit comprises two rotor magnet arrangements, arranged at a distance from one another along the spacing axis, between which the stator magnet arrangement is arranged. Each of those rotor magnet arrangements can then interact with a different magnetic-pole active side of one and the same stator magnet arrangement in order to generate a drive force.

On the other hand—and this is the preferred manner of utilization—in addition to the drive-force-increasing effect for the same number of pipetting units, an effect that decreases dimensions can be achieved; or the number of drivable pipetting devices can be increased for one and the same dimension of the pipetting apparatus. The pipetting apparatus then encompasses at least two separate pipetting units, each of which comprises a pipetting conduit and each of which is guided to move on the guidance arrangement along the motion axis. Different pipetting units each comprise at least, preferably exactly, one rotor magnet arrangement, the rotor magnet arrangements of different pipetting units being arranged with a spacing from one another along the spacing axis. The common stator magnet arrangement is then located between them.

The reason is that it is then possible to arrange the rotor magnet arrangements of pipetting units that directly follow one another along the motion axis, and are driven to move by interaction with one and the same stator magnet arrangement, alternatingly oppositely from the one and from the other magnetic-pole active side of the same stator magnet arrangement. The rotor magnet arrangements of pipetting units interacting with one and the same stator magnet arrangement along the motion axis are then located alternatingly on different sides of the stator magnet arrangement. They therefore cannot collide. If the pipetting units that interact along one and the same stator magnet arrangement with that arrangement in order to achieve a drive force are considered to be numbered in ascending order starting at "1", the rotor magnet arrangements of all odd-numbered pipetting units can then be located on the one side of the stator magnet arrangement, and can be located oppositely from its one magnetic-pole active side and can thus interact therewith. The rotor magnet arrangements of all even-numbered pipetting units can likewise be located on the respective other side of the stator magnet arrangement, and can be located oppositely from its other magnetic-pole active side and consequently can interact therewith.

When the pipetting apparatus comprises a plurality of pipetting units, which in practice will be the case for most pipetting apparatuses, the parallel pipetting conduits of the plurality of pipetting units preferably lie in one common pipetting-conduit plane that proceeds parallel to the motion axis. Preferably, but not necessarily, the pipetting-conduit plane proceeds orthogonally to the spacing axis. The pipetting apparatus can, however, also be constructed in such a way that the pipetting-conduit plane is oriented parallel to the spacing axis.

In principle, the stator magnet arrangement can have any cross-sectional shape, the cross section of the stator magnet arrangement preferably being constant along the motion axis in terms of size and shape. The stator magnet arrangement preferably has a cuboidal or cube-like shape. The stator magnet arrangement therefore has at least two parallel flat outer surfaces that each constitute one magnetic-pole active side of the stator magnet arrangement. The stator magnet arrangement preferably has its longest dimension along the motion axis, in order to enable a maximally long motion path for the pipetting units. To achieve a minimal installation space requirement, the stator magnet arrangement preferably has its shortest dimension as a thickness dimension between the two magnetic-pole active sides. The thickness direction is orthogonal to the motion axis. The width dimension of the stator magnet arrangement, orthogonally to the motion axis and orthogonally to the thickness dimension, is an indicator of the possible surface overlap between the rotor and stator magnet arrangements. It is preferably between four and ten times the thickness dimension.

Proceeding from the preferred shape of the stator magnet arrangement, according to a preferred refinement of the present invention the gap axes along which the rotor magnet arrangements, arranged with a spacing from one another along the spacing axis, of the common stator magnet arrangement are located opposite one another, are mutually parallel. As a result, the linear drive arrangement constituted from the stator magnet arrangement and a plurality of rotor magnet arrangements can be implemented with little installation space.

In order to achieve maximum uniformity in terms of forces on the two magnetic-pole active sides, it can be useful to meet one or several symmetry conditions. For example, the common stator magnet arrangement that has different magnetic-pole active sides can be physically embodied mirror-symmetrically with respect to a longitudinal center plane parallel to the motion axis. A distinction is to be made here between magnetic symmetry and physical symmetry: a component is magnetically symmetrical if it comprises, on both sides of the plane of symmetry, like-pole magnetized regions having a symmetrical region shape. A component is physically symmetrical, on the other hand, if it has symmetrical physical regions on both sides of the plane of symmetry.

The aforementioned physical symmetry ensures that the same mass distribution exists on both sides of the longitudinal center plane, making it possible, independently of the respective local magnetization, for an approximately equal magnetic field strength distribution to be achievable on both sides of the longitudinal center plane along the motion axis. Preferably the stator magnet arrangement is only physically symmetrical, but not magnetically symmetrical, with respect to the longitudinal center plane. Preferably the magnets of the stator magnet arrangement are polarized with polarization directions proceeding orthogonally to the longitudinal center plane. This means that in a preferred embodiment, the boundary region between unlike magnetic poles lies in the longitudinal center plane. The stator magnet arrangement is then magnetically asymmetrical with respect to the longitudinal center plane, since at a location in the longitudinal center plane unlike pole regions lie on both sides of the same.

Preferably the aforesaid longitudinal center axis is not only parallel to the motion axis, but also parallel to the outer surfaces constituting the preferably parallel magnetic-pole active sides. The aforesaid longitudinal center axis is therefore preferably orthogonal to the thickness direction of the stator magnet arrangement.

Because, in accordance with physical models, magnetic field lines as a rule proceed orthogonally to exposed outer surfaces of magnets, a drive force acting on a rotor magnet arrangement can be achieved particularly efficiently when the gap axis, along which the rotor magnet arrangement is located oppositely from the magnetic-pole active side of the stator magnet arrangement, proceeds orthogonally to the outer surface constituting the magnetic-pole active side and/or orthogonally to the longitudinal center plane. This applies to rotor magnet arrangements that are arranged on both sides of one common stator magnet arrangement and are located oppositely from different magnetic-pole active sides.

It is furthermore advantageous, in terms of achieving uniform force effects at the rotor magnet arrangements located oppositely from different magnetic-pole active sides, if the common stator magnet arrangement is embodied magnetically mirror-symmetrically with respect to a width symmetry plane of the common stator magnet arrangement which is parallel both to the motion axis and to the thickness direction of the common stator magnet arrangement. The width symmetry plane is preferably oriented orthogonally to the aforementioned longitudinal center plane. When the symmetry condition just recited is met, only one magnetic pole is located on one and the same magnetic-pole active site at a predefined location along the motion axis on both sides of the width symmetry plane. The other magnetic pole is located on the other magnetic-pole active side. In addition to this magnetic mirror symmetry, a physical mirror symmetry can also exist with respect to the width symmetry plane. The stator magnet arrangement can therefore be embodied physically mirror-symmetrically with respect to two mutually orthogonal planes, namely the longitudinal center plane and the width symmetry plane.

In order to achieve a maximally uniform force acting on a plurality of rotor magnet arrangements regardless of the magnetic-pole active side associated with them, it is preferred if the gap axes are parallel to the spacing axis. That is the case, in the particularly preferred embodiment having mutually parallel outer surfaces that constitute different magnetic-pole active sides, if the rotor magnet arrangements are located, oppositely from each outer surface of the stator magnet arrangement, with end surfaces parallel to the outer surface.

The term "gap axis" refers in the present Application to an axis that proceeds between an end surface, facing toward the magnetic-pole active side of the stator magnet arrangement, of a rotor magnet arrangement, and an outer surface, facing toward the rotor magnet arrangement and constituting a magnetic-pole active side, of the stator magnet arrangement. If the end surface and the outer surface are parallel to one another, as in the preferred case, the gap axis is the line normal onto the end surface and outer surface. If (less preferably) the end surface and outer surface enclose an angle, the gap axis is intended in case of doubt to be a line normal to an angle-bisecting surface between the end surface and outer surface.

Uniform magnetic effects, and thus identical forces acting on the movable rotor magnet arrangements that interact with different magnetic-pole active sides, can be achieved by the fact that the polarization directions of the magnets of the common stator magnet arrangement proceed parallel to the gap axes. In the case in which the aforesaid longitudinal center plane constitutes a physical mirror-symmetry plane, the polarization directions of the magnets of the common stator magnet arrangement are preferably parallel to the longitudinal center plane. Magnetic mirror symmetry with respect to the aforementioned width symmetry plane can thereby also be achieved.

For a maximally stable and permanent configuration of the stator magnet arrangement, the latter can comprise on at least one of its outer surfaces constituting its magnetic-pole active sides, preferably on both such outer surfaces in the interest of symmetry, a support strip made of a nonmagnetic, i.e. in particular non-ferromagnetic, material. To avoid an undesirably high magnetic resistance between such an outer surface and the rotor magnet arrangement located oppositely from it, however, any such support strip should be thin, and can therefore offer little stabilization for the stator magnet arrangement. In order to achieve minimal magnetic resistance levels, the outer surfaces, forming magnetic-pole active sides, of the stator magnet arrangement are exposed along the air gap formed with the rotor magnet arrangements.

For maximally stable provision of the stator magnet arrangement that is constantly being acted upon by magnetic forces, the stator can comprise a holding strip that proceeds along the motion axis and is mechanically and/or adhesively connected to magnets of the common stator magnet arrangement which follow one another along the motion axis. The holding strip preferably does not protrude beyond a magnetic-pole active side of the stator magnet arrangement. The holding strip is therefore particularly preferably at least no thicker than, even more preferably thinner than, the stator magnet arrangement.

To further enhance the stability of the stator magnet arrangement, the stator can comprise, at a distance from the (then, first) holding strip, a second holding strip parallel thereto that is mechanically and/or adhesively connected to magnets of the common stator magnet arrangement which follow one another along the motion axis, the holding strip and the second holding strip holding the stator magnet arrangement between them. The holding strips are preferably arranged with a spacing from one another along the aforementioned width dimension of the stator magnet arrangement. The statements made in the present Application regarding the first holding strip apply to the second holding strip.

In order for the holding strip and the second holding strip to interfere as little as possible with the rotor magnet arrangements, it is preferred if the holding strip and the second holding strip are arranged with a spacing from one another both orthogonally to the motion axis and orthogonally to the gap axes of the rotor magnet arrangements that interact with the common stator magnet arrangement. For the same reason, it is preferred that the holding strip and the second holding strip be arranged at a distance from one another orthogonally to the spacing axis.

In order to stabilize the stator magnet arrangement, the holding strip and/or the second holding strip must be able to exert force on the magnets of the stator magnet arrangement. Provision can be made for that purpose that the holding strip and/or the second holding strip define an immobilization gap or an immobilization groove into which an immobilization projection that stands out from the stator magnet arrangement protrudes. The immobilization projection can be embodied in one piece with the stator magnet arrangement, for example by corresponding configuration of the individual magnets. The permanent magnets that are preferred as magnets are, however, often brittle because of their material, and tend to break when subjected to only a local external force. It can therefore be advantageous if the immobilization projection is embodied on a first sub-strip of the holding strip and/or of the second holding strip. The first sub-strip is manufactured from nonmagnetic material and is connected, in particular adhesively bonded, to the magnets of the stator magnet arrangement. The first sub-strip can have, for example, a T-shaped profile; the crossbar can be connected to the stator magnet arrangement, in particular to its narrow side that proceeds along the motion axis and in a thickness direction, so that the upright, protruding approximately centeredly from the crossbar connected to the stator magnet arrangement, can serve as an immobilization projection. A second sub-strip of the holding strip and/or of the second holding strip can then comprise a groove into which the upright penetrates.

For the selection of maximally suitable materials, and in particular in order to avoid induction effects, such as formation of eddy currents, in the holding strip and/or in the second holding strip due to the rotor magnet arrangements that are movable relative to the holding strip and/or to the second holding strip, the holding strip and/or the second holding strip can be constructed from a plurality of slat strip components. The slat strip components are preferably arranged to follow one another in an abutment direction orthogonal to the motion axis. The abutment direction in which the slat strip components are stacked preferably proceeds parallel to the gap axes and/or to the thickness direction of the stator magnet arrangement, the gap axes and the thickness direction being parallel in the particularly preferred embodiment. In addition, by way of correspondingly differently dimensioned slat strip components, the above-described immobilization gap or immobilization groove can easily already be constituted upon manufacture of the slat strip components by stacking. According to a preferred refinement, the holding strip and/or the second holding strip, or at least one, preferably all, of the slat strip components, are produced from stainless steel, preferably austenitic steel. Stainless steel having the material number 1.4301 is particularly preferred.

As has already been indicated above, the pipetting apparatus preferably comprises a plurality of pipetting units, the pipetting conduits thereof also preferably being located in one common pipetting-conduit plane that is parallel to the motion axis. The plurality of pipetting units, preferably all the pipetting units, usually protrude on the same side of the guidance arrangement that guides them to move along the motion axis. The guidance arrangement must therefore be able to brace against not only forces orthogonal to the motion axis, but also moments around the motion axis. This moment bracing can advantageously be accomplished by the fact that each pipetting unit is guided on two guidance rails arranged with a spacing from one another. According to a preferred refinement, the guidance arrangement can therefore comprise at least four parallel guidance rails that are arranged in such a way that they form the edges of an enveloping surface of an imaginary prism. For a preferred refinement of the present invention in order to improve the ability of pipetting units to come close to one another along the motion axis, simultaneously with an advantageously large guidance spacing of the guidance locations of the pipetting units on their respective guidance rails, it is the case for a plurality of pipetting units, preferably all pipetting units, that a pipetting unit is guided to move on two guidance rails between which, in each of two opposite circumferential directions of the enveloping surface, at least one further prism edge defined by a guidance rail that is not guiding the respective pipetting unit is located. In order to avoid unnecessarily high parts counts, the guidance arrangement preferably comprises exactly four guidance rails. It is likewise preferred, for reasons of installation space usage and in the interest of maximum uniformity of forces occurring on the guidance rails, if the prism is a cuboid. Again in the interest of minimal installation space usage, the stator magnet arrangement is arranged in the interior of the virtual prism.

Preferably all the pipetting units guided on the guidance arrangement are guided as described above.

The guidance arrangement having the at least four, preferably exactly four, guidance rails is preferably carried by one common chassis or chassis portion.

To maximize the ability of the pipetting units to approach one another along the motion axis, according to a preferred refinement of the present invention, pipetting units that directly follow one another along the motion axis are each guided to move on a different pair of guidance rails. It is further preferred if pipetting units that are guided along the same guidance arrangement and that directly follow one another along the motion axis do not share guidance rails, so that those pipetting units can be brought as close as possible to one another along the motion axis. It is thus particularly preferably the case for each two pipetting units that directly follow one another along the motion axis that the respective pairs of guidance rails which guide them do not have a common guidance rail.

To further improve the ability of pipetting units that directly follow one another along the motion axis to come close to one another, the pipetting apparatus can comprise a plurality of stator magnet arrangements. In order to enable an interaction, with as few problems as possible, between rotor magnet arrangements and their respectively associated magnetic-pole active sides, the stator magnet arrangements are arranged at a distance from one another which is orthogonal to the motion axis. Once again in the interest of minimal installation space usage, the plurality of stator magnet arrangements is preferably arranged in one common plane of extent. The plurality preferably encompasses exactly two stator magnet arrangements. The plurality of stator magnet arrangements, and the at least four guidance rails of the guidance arrangement, are preferably arranged on one and the same carrying portion of the stationary chassis of the pipetting apparatus.

As a general rule, in order to receive the largest possible number of pipetting units, the pipetting apparatus preferably comprises n separate stator magnet arrangements having 2n magnetic-pole active sides. The rotor magnet arrangements of any group of 2n pipetting units that directly follow one another along the motion axis are then each associated with different magnetic-pole active sides, and interact with them to produce a drive force. As a result, the pipetting units can be brought close to one another along the motion axis, preferably with a pipetting-conduit spacing of 9 mm or less. As stated above, preferably n=2.

BRIEF DESCRIPTION OF THE DRAWING FIGURES

The present invention will be explained in further detail below with reference to the appended drawings, in which.

DETAILED DESCRIPTION OF THE PREFERRED EMBODIMENTS

Figure 1:
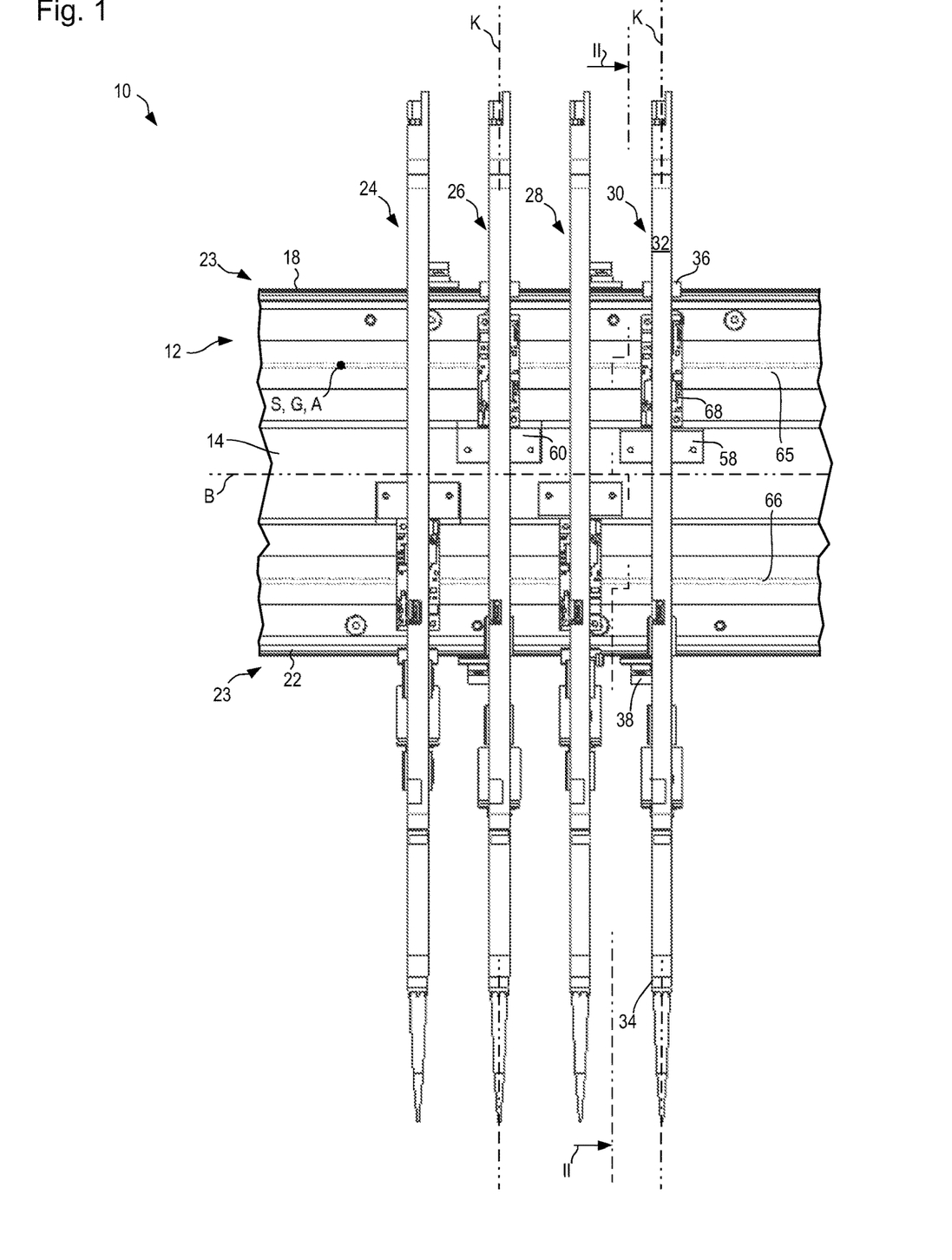
FIG. 1 is a schematic plan view of an embodiment according to the present invention of a pipetting apparatus.
Figure 2:
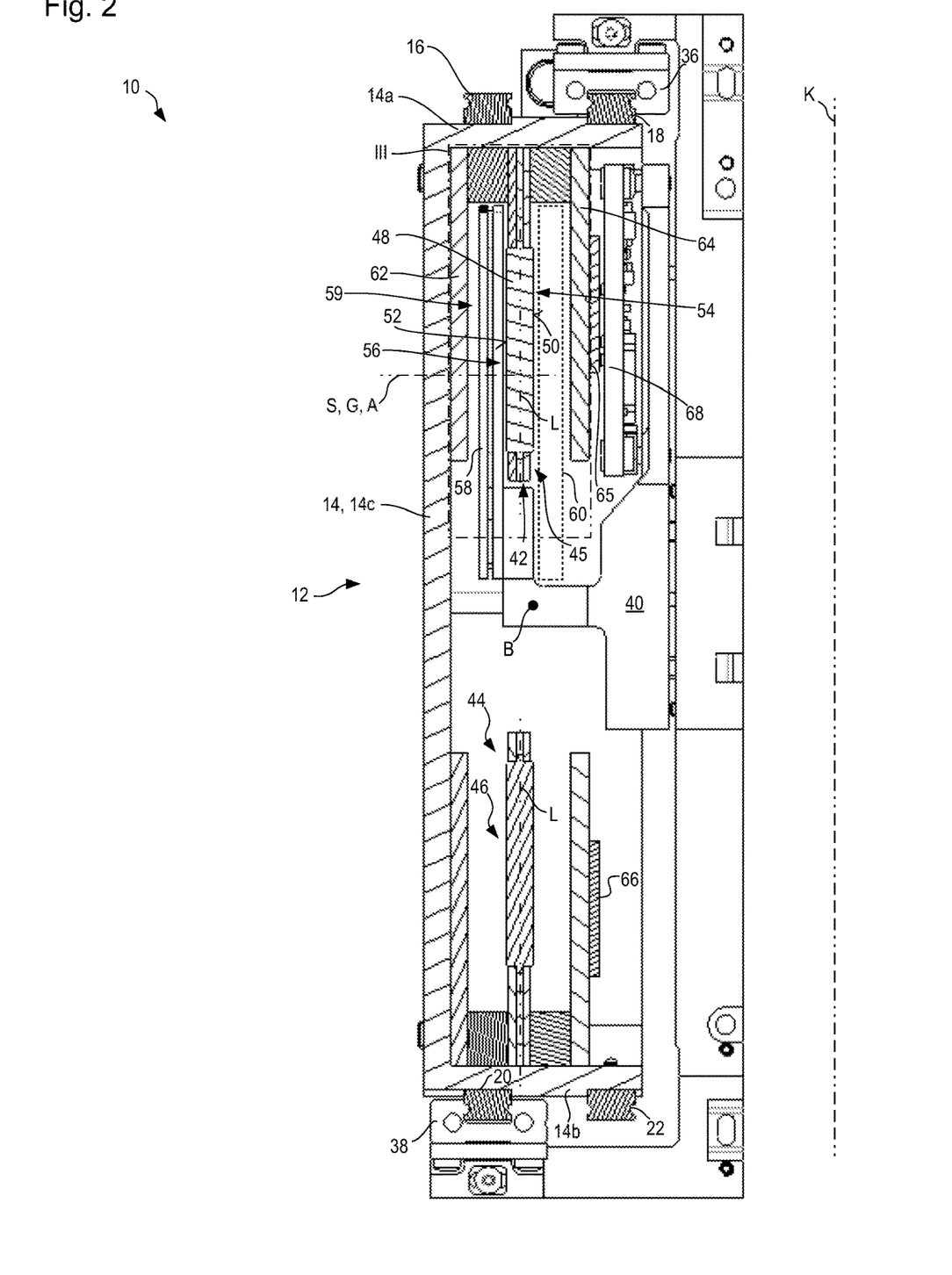
FIG. 2 is a schematic cross-sectional view through the embodiment of FIG. 1, looking at section surface II-II in FIG. 1.
Figure 3:
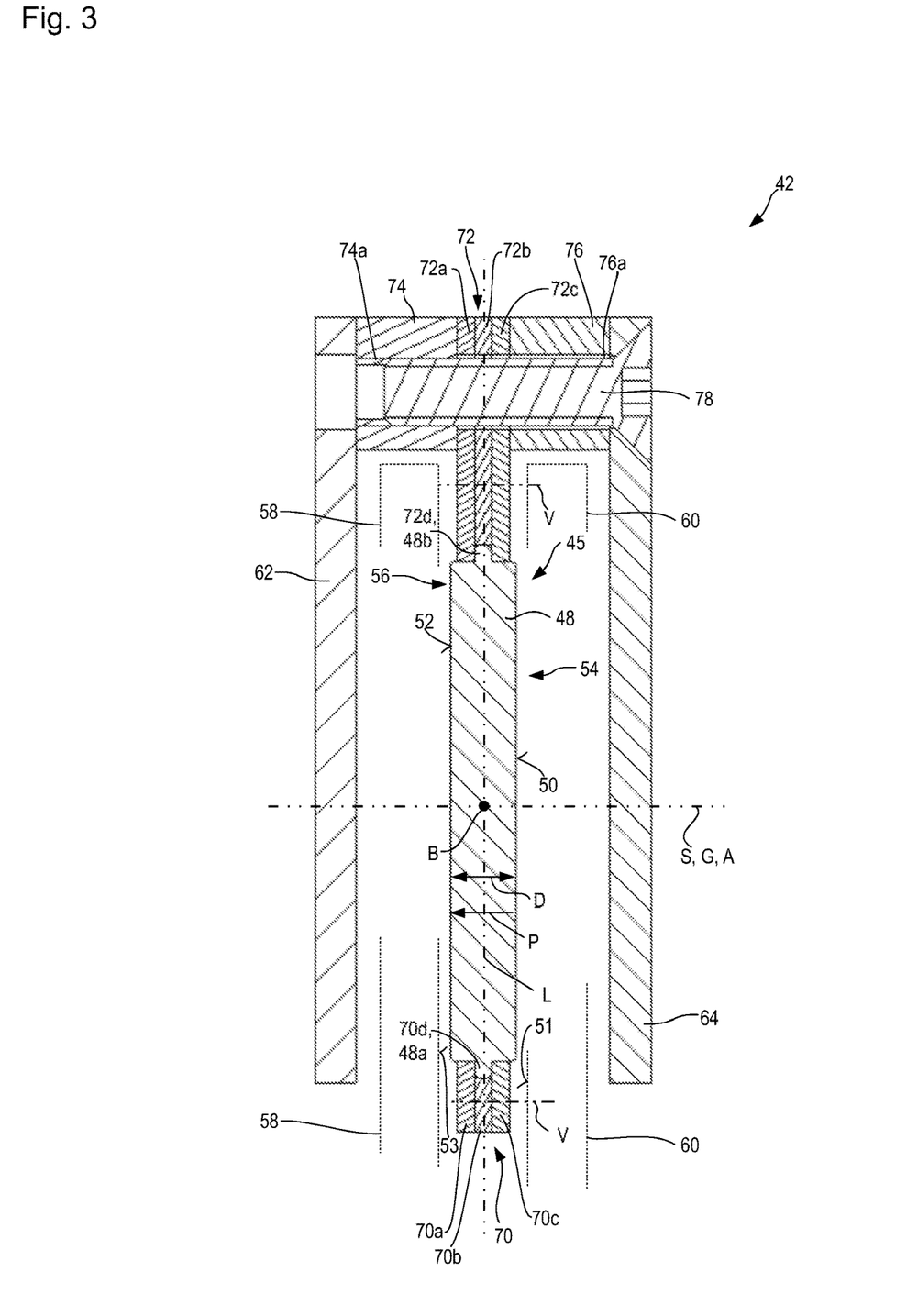
FIG. 3 is a schematic enlarged cross-sectional view of region III in FIG. 2, the pipetting units and guidance rails having been omitted in the interest of better clarity.

In FIGS. 1 to 3, an embodiment according to the present invention of a pipetting apparatus of the present Application is labeled in general with the number 10. Pipetting apparatus 10 comprises a chassis 12 that is stationary with respect to the installation location of pipetting apparatus 10. In the present example, carrying portion 14 of chassis 12 which is shown in FIGS. 1 and 2 is constituted from a C-shaped extruded profile made of a nonmagnetic material. This can be a plastic, in particular a filled plastic. It is preferably a metal, for example aluminum.

Two guidance rails (see FIG. 2) are respectively installed on the outer sides of its two parallel limbs 14a and 14b that are connected to one another by a base 14c. The guidance rails of upper (in FIG. 2) limb 14a have reference characters 16 and 18; the guidance rails of lower limb 14b have reference characters 20 and 22. Only guidance rails 18 and 22, which face toward the viewer, are visible in FIG. 1. The other two guidance rails 16 and 20 are concealed by guidance rails 18 and 22 that are depicted. Guidance rails 16 to 22, which together constitute a guidance arrangement 23, are usual guidance rails of a linear guide.

As is apparent from FIG. 1, pipetting apparatus 10 comprises a plurality of pipetting units, four pipetting units 24, 26, 28, and 30 of which are depicted representatively in FIG. 1. Pipetting units 24 to 30 are of identical construction, so that a description of one pipetting unit applies to all pipetting units of pipetting apparatus 10. Pipetting unit 30, which is also depicted in FIG. 2, will be adduced as an example.

In a manner that is known per se, pipetting unit 30 comprises a pipetting conduit 32 that extends along a pipetting conduit axis K. Pipetting conduit axes K of all pipetting units 24 to 30 are mutually parallel and preferably lie in one common conduit-axis plane. Pipetting conduit axes K are parallel to the drawing plane of FIGS. 1 and 2. Releasably coupled onto pipetting conduits 24 to 30, in a manner known per se, are single-use pipette tips 34 into which, in a manner also known per se, liquid can be aspirated and from which aspirated liquid can be dispensed.

Pipetting unit 30 is guided in the region of upper limb 14a by an upper guidance carriage 36, and in the region of lower limb 14b by a lower guidance carriage 38, to move along motion axis B that is defined by guidance rails 16 to 22 or by guidance arrangement 23. Motion axis B proceeds parallel to the drawing plane of FIG. 1, and orthogonally to the drawing planes of FIGS. 2 and 3. In order to achieve an advantageous maximally large guidance spacing, guidance carriages 36 and 38 of pipetting unit 30 are guided on guidance rails 18 and 20 that are diametrically opposite with respect to motion axis B. They thus have a spacing from one another both along pipetting-conduit axis K and orthogonally thereto.

As is evident from FIG. 2, the four guidance rails 16 to 22 are arranged in such a way that they form the edges of an enveloping surface of an imaginary cuboid. Each pipetting unit of pipetting apparatus 10 is guided on two guidance rails located on a diagonal plane proceeding along motion axis B. Pipetting units that directly follow one another along motion axis B are alternatingly guided on completely different pairs of guidance rails, the pipetting unit closest but one to a reference pipetting unit along motion axis B being guided by the same pair of guidance rails as the reference pipetting unit. Pipetting units 24 and 28 are thus guided on guidance rails 16 and 22, while pipetting units 26 and 30 are guided on guidance rails 18 and 20. The guidance carriages of each pair of guidance carriages which guides a pipetting unit on a pair of guidance rails thus have a spacing from one another both along pipetting-conduit axis K and orthogonally thereto.

For an even greater increase in the guidance spacing of the guidance carriages of a pipetting unit, the latter are preferably also arranged with a spacing from one another along motion axis B, although in the present exemplifying embodiment the spacing achieved along motion axis B is substantially smaller than the guidance spacing achieved orthogonally to motion axis B.

Guidance carriages 36 and 38 of pipetting unit 30 are coupled to one another by a pipetting unit frame 40 for motion together. Pipetting conduit 32, which is not depicted separately in FIGS. 2 and 3 but whose pipetting-conduit axis K is also shown in FIG. 2 in terms of its relative orientation, is mounted on frame 40.

Pipetting units 24 to 30 are each driven in linear-motor fashion to move along motion axis B. Pipetting apparatus 10 comprises for that purpose a total of two stators 42 and 44, which are of substantially identical construction and are arranged in carrying portion 14 of chassis 12 in merely mirror-image fashion or with a 180° rotation relative to one another. For that reason, it is sufficient to describe the upper (in FIG. 2) stator 42, the description of which is also applicable to lower stator 44.

For a description of stator 42, reference is made to FIG. 3, which shows upper stator 42 at enlarged scale.

Stator 42 comprises, as a central component, a stator magnet arrangement 45 that proceeds orthogonally to the drawing plane of FIGS. 2 and 3 and thus along motion axis B. Stator magnet arrangement 45 encompasses permanent magnets 48 that follow one another along motion axis B, are embodied substantially identically, and are arranged only successively with alternating polarization directions P. In the exemplifying embodiment depicted, permanent magnets 48 are polarized in their thickness direction D; by definition, the magnetic south pole follows the magnetic north pole of the respective permanent magnet 48 in polarization direction P.

Polarization direction P of permanent magnet 48 depicted in FIG. 3 proceeds from right to left, i.e. the magnetic north pole of permanent magnet 48 is located on its physical right side, and the magnetic south pole correspondingly on its physical left side. Permanent magnet 48, and thus stator magnet arrangement 45 as a whole, is embodied physically mirror-symmetrically with respect to a longitudinal center plane L that proceeds along motion axis B and orthogonally to thickness direction D. Longitudinal center plane L also constitutes the separating plane between the magnetic poles, so that permanent magnet 48 and stator magnet arrangement 45 as a whole are mirror-symmetrical only physically, but not magnetically, with respect to longitudinal center plane L.

Permanent magnet 48, and stator magnet arrangement 45 as a whole, are furthermore embodied to be both physically and magnetically mirror-symmetrical with respect to a thickness center plane that constitutes a thickness symmetry plane S and is orthogonal to longitudinal center plane L.

What is special about stator magnet arrangement 45 is that it comprises not just one exposed outer surface 50 but two mutually oppositely located exposed outer surfaces 50 and 52. Located oppositely from each of these outer surfaces 50 and 52, on the completely assembled, operationally ready pipetting apparatus 10, is a respective end surface 51 and 53 of a respective rotor magnet arrangement 58 and 60 (see FIG. 3). Stator magnet arrangement 45 thus comprises two magnetic-pole active sides 54 and 56, one on each outer surface 50 and 52. The magnetic field proceeding from stator magnet arrangement 45 is thus usable for generation of a drive force on both opposite sides 54 and 56 of stator magnet arrangement 45.

FIG. 2 depicts rotor magnet arrangement 58 of pipetting unit 30, which is located behind section plane II-II and which, connected to pipetting unit frame 40 for motion together, is located with its end surface 53 (see FIG. 3) opposite magnetic-pole active side 56 of the upper stator magnet arrangement 45, forming a small air gap along a gap axis G. Rotor magnet arrangement 58 encompasses a coil arrangement (not visible in FIG. 2) made up of at least three coils that are associated with different, mutually shifted electrical phases.

Stator 42 and rotor magnet arrangements 58 and 60 constitute a linear drive arrangement 59.

A rotor magnet arrangement 60 of pipetting unit 26, which is located in front of section plane II-II and which interacts with the same stator magnet arrangement 45 as rotor magnet arrangement 58 but with its other magnetic-pole active side 54, is depicted with dashed lines in FIG. 2. This magnetic-pole active side 54 is located oppositely from end surface 51 of rotor magnet arrangement 60 (see FIG. 3). Rotor magnet arrangements 58 and 60, which are arranged with a spacing from one another along a spacing axis A, are constrainedly offset from one another along motion axis B. That offset is not, however, intended to play any part here in the determination of spacing axis A. Spacing axis A is always orthogonal to motion axis B. Spacing axis A in the present case is coaxial with or parallel to gap axes G, gap axes G of both rotor magnet arrangements 58 and 60 being parallel. Stator magnet arrangement 45 is thus located between rotor magnet arrangements 58 and 60, arranged with a spacing from one another orthogonally to motion axis B and in particular along spacing axis A that is orthogonal to outer surfaces 50 and 52 of stator magnet arrangement 45, of different respective pipetting units 30 and 26.

Be it noted merely for the sake of completeness that rotor magnet arrangement 60 can alternatively be connected for motion together with the same pipetting unit 30 as rotor magnet arrangement 58. It is then possible, because of the bilateral utilization of the magnetic field proceeding from stator magnet arrangement 45, to exert on pipetting unit 30, in a context of dimensions of pipetting unit 30 which are otherwise identical, a drive force that is higher, ideally two times higher, than if pipetting unit 30 had only one rotor magnet arrangement 58.

When each pipetting unit comprises only one rotor magnet arrangement, as in the exemplifying embodiment depicted, thanks to the bilaterally usable stator magnet arrangement 45, 46 it is possible, with the same design in terms of guidance arrangement 23 and stator magnet arrangements 45 and 46, to arrange twice as many linear-motor-driven pipetting units on pipetting apparatus 10 compared with the case in which each of stator magnet arrangements 45 and 46 has only one respective magnetic-pole active side.

Longitudinal center planes L of the two stator magnet arrangements 45 and 46 are located in coplanar fashion in one common plane.

A particular design of the associated stators 42 and 44 is necessary in order to furnish stator magnet arrangements 45 and 46 that have exposed outer surfaces for the constitution of magnetic-pole active sides. As shown in FIG. 3, stator magnet arrangement 41 is held, in its width direction that is orthogonal both to motion axis B and to thickness direction D (that is, in addition to the motion axis, the second direction of extent of longitudinal center plane L), by holding strips 70 and 72 arranged with a spacing from one another.

Holding strips 70 and 72 each encompass two respective outer slat strip components 70a, 70c and 72a, 72c, which comprise between them a respective center slat strip component 70b, 72b. Slat strip components 70a to 70c and 72a to 72c are manufactured from nonmagnetic material. Slat strip components 70a to 70c and 72a to 72c are bundled along a stacking axis V and follow one another along stacking axis V. Stacking axis V is orthogonal to the respective mutually parallel main planes of extent of slat strip components 70a to 70c and 72a to 72c. The center slat strip components 70b and 72b are embodied to be shorter, orthogonally to motion axis B and orthogonally to stacking axis V, than the respective slat strip components 70a, 70c and 72a, 72c that externally enclose them. A respective immobilization groove 70d, 72d proceeding along motion axis B can thus be constituted on each holding strip 70 and 72. Projecting into these immobilization grooves 70d and 72d are respective immobilization projections 48a, 48b of permanent magnet 48 which, in the exemplifying embodiment depicted, are embodied in one piece with permanent magnet 48. Immobilization projections 48a and 48b that project into immobilization grooves 70d and 72d are thus positively held by holding strips 70 and 72. Immobilization projections 48a and 48b can additionally be adhesively secured on holding strips 70 and 72 using adhesive.

Holding strip 72 is clamped by a bolt 78 between shields 62 and 64, with interposition of spacing elements 74 and 76. Spacing element 74 can comprise a thread 74a into which bolt 78 is threaded, while the respective other spacing element 76 can comprise a passthrough opening 76a.

Stators 42 and 44 can in turn be connected to chassis 12 with usual fastening means, for example bolts and the like, or adhesively.

As depicted in FIG. 3, shield 62 or 64 can be located oppositely from stator magnet arrangement 46 at a distance along spacing axis A or along gap axis G. One of these shields (shield 64, in the example depicted) can comprise on its side facing away from stator magnet arrangement 46 a length scale 65 that can be scanned by a reading head 68 during the operation of pipetting apparatus 10 in order to determine the position of the respective pipetting unit along motion axis B.

Reading head 68 can comprise control electronics for controlling the energization of rotor magnet arrangement 58.

Each of the four pipetting units 24 to 30 depicted in FIG. 1 is associated, via its respective rotor magnet arrangement, with a different magnetic-pole active side of the two stator magnet arrangements 45 and 46, and interacts with it to generate a drive force.

The invention claimed is:

1. A pipetting apparatus comprising: a plurality of pipetting units each comprising a pipetting conduit;
a guidance arrangement having at least four guidance rails on which the plurality of pipetting units is guided to move along a motion axis;
a linear drive arrangement with which the plurality of pipetting units is drivable to move along the motion axis, the linear drive apparatus comprising a stator that is stationary relative to the guidance arrangement, and each pipetting unit of the plurality of pipetting units constituting a rotor, which is movable relative to the stator along the motion axis, of the linear drive arrangement;
wherein the stator comprises a single stator magnet arrangement connected fixedly to the guidance arrangement;
wherein the stator magnet arrangement encompasses a plurality of magnets that are arranged to follow one another with alternating magnetic-pole orientations along the motion axis;
wherein each rotor comprises at least one energizable electromagnetic rotor magnet arrangement that is located oppositely from the stator magnet arrangement along a gap axis orthogonal to the motion axis;
wherein at least two energizable electromagnetic rotor magnet arrangements interact in drive-force-generating fashion with the stator magnet arrangement as a common stator arrangement, wherein the at least two one energizable electromagnetic rotor magnet arrangements are arranged with a spacing from one another along a spacing axis orthogonal to the motion axis, wherein the common stator magnet arrangement is located between the at least two rotor magnet arrangements,
wherein the pipetting conduits of the plurality of pipetting units lie in one common pipetting-conduit plane that proceeds parallel to the motion axis; and
wherein the at least four guidance rails are arranged to form to form the edges of an enveloping surface of an imaginary prism, wherein each pipetting unit of the plurality of pipetting units is guided to move on two guidance rails between which, in each of two opposite circumferential directions of the enveloping surface, at least one further edge defined by the guidance rail that is not guiding the respective pipetting unit is located.

2. The pipetting apparatus according to claim 1, wherein the plurality of pipetting units includes at least two separate pipetting units, each of which comprises a pipetting conduit and each of which is guided to move on the guidance arrangement along the motion axis, wherein each of the at least two separate pipetting units comprises a rotor magnet arrangement, wherein the rotor magnet arrangements of the at least two separate pipetting units are arranged with a spacing from one another along the spacing axis and between which the common stator magnet arrangement is located.

3. The pipetting apparatus according to claim 1, wherein the rotor magnet arrangements of the common stator magnet arrangement, which are arranged with a spacing from one another along the spacing axis, are located opposite one another along mutually parallel gap axes.

4. The pipetting apparatus according to claim 3, wherein the gap axes are parallel to the spacing axis.

5. The pipetting apparatus according to claim 3, wherein a polarization directions of each magnet of the common stator magnet arrangement proceed parallel to the gap axes.

6. The pipetting apparatus according to claim 1, wherein the stator comprises a holding strip that proceeds along the motion axis and is at least one of mechanically and adhesively connected to magnets of the common stator arrangement which follow one another along the motion axis.

7. The pipetting apparatus according to claim 6, wherein the stator comprises, at a distance from the holding strip, a second holding strip parallel thereto that is at least one of mechanically and adhesively connected to magnets of the common stator magnet arrangement which follow one another along the motion axis, the holding strip and the second holding strip holding the stator magnet arrangement between them.

8. The pipetting apparatus according to claim 7, wherein the rotor magnet arrangements of the common stator magnet arrangement, which are arranged with a spacing from one another along the spacing axis, are located opposite one another along mutually parallel gap axes;

wherein the holding strip and the second holding strip are arranged with a spacing from one another both orthogonally to the motion axis and orthogonally to the gap axes of the rotor magnet arrangements that interact with the common stator magnet arrangement.

9. The pipetting apparatus according to one of claim 7, wherein the holding strip and the second holding strip are arranged at a distance from one another orthogonally to the spacing axis.

10. The pipetting apparatus according to one of claim 6, wherein at least one of the holding strip and the second holding strip define an immobilization gap, into which an immobilization projection that stands out from the stator magnet arrangement protrudes.

11. The pipetting apparatus according to one of claim 6, wherein at least one of the holding strip and the second holding strip is constructed from a plurality of slat strip components that are arranged to follow one another along a stacking axis orthogonal to the motion axis.

12. The pipetting apparatus according to claim 1, wherein pipetting units that directly follow one another along the motion axis are each guided to move on a different pair of guidance rails.

13. The pipetting apparatus according to claim 2 wherein said pipetting apparatus further comprises a plurality of stator magnet arrangements that are arranged at a distance from one another which is orthogonal to the motion axis.

14. The pipetting apparatus according to claim 4, wherein a polarization direction of each magnet of the common stator magnet arrangement proceeds parallel to the gap axes.

15. The pipetting apparatus according to claim 1, wherein the plurality of pipetting units includes at least two separate pipetting units, each of which comprises a pipetting conduit and each of which is guided to move on the guidance arrangement along the motion axis, wherein each of the at least two separate pipetting units comprises a rotor magnet arrangement, wherein the motor magnet arrangements of the at least two separate pipetting units are arranged with a spacing from one another along the spacing axis and between which the common stator magnet arrangement is located;

wherein said pipetting apparatus comprises a plurality of stator magnet arrangements that are arranged at a distance from one another which is orthogonal to the motion axis, the plurality of stator magnet arrangements being arranged in one common plane of extent.

16. The pipetting apparatus according to one of claim 6, wherein at least one of the holding strip and the second holding strip define an immobilization groove, into which an immobilization projection that stands out from the stator magnet arrangement protrudes.

17. The pipetting apparatus according to claim 12, wherein the pairs of guidance rails which respectively guide each pair of pipetting units of the plurality of pipetting units that directly follow one another along the motion axis, do not comprise a common guidance rail.

* * * * *